US010855133B2

(12) United States Patent
Miyachi et al.

(10) Patent No.: US 10,855,133 B2
(45) Date of Patent: Dec. 1, 2020

(54) DRIVE DEVICE

(71) Applicant: DENSO CORPORATION, Kariya (JP)

(72) Inventors: Shuhei Miyachi, Kariya (JP); Takashi Tsuboi, Kariya (JP)

(73) Assignee: DENSO CORPORATION, Kariya (JP)

( * ) Notice: Subject to any disclaimer, the term of this patent is extended or adjusted under 35 U.S.C. 154(b) by 100 days.

(21) Appl. No.: 16/077,851

(22) PCT Filed: Jan. 24, 2017

(86) PCT No.: PCT/JP2017/002209
§ 371 (c)(1),
(2) Date: Aug. 14, 2018

(87) PCT Pub. No.: WO2017/141637
PCT Pub. Date: Aug. 24, 2017

(65) Prior Publication Data
US 2019/0296602 A1 Sep. 26, 2019

(30) Foreign Application Priority Data

Feb. 16, 2016 (JP) ................... 2016-026544

(51) Int. Cl.
H02K 5/10 (2006.01)
H02K 11/33 (2016.01)
H02K 5/22 (2006.01)
H02K 11/00 (2016.01)

(52) U.S. Cl.
CPC ............. H02K 5/10 (2013.01); H02K 5/22 (2013.01); H02K 11/0094 (2013.01); H02K 11/33 (2016.01)

(58) Field of Classification Search
CPC . H02K 11/33; H02K 9/22; H02K 3/50; H02K 11/02; H02K 5/12
USPC .................. 310/71, 75 R, 88, 98, 64
See application file for complete search history.

(56) References Cited

U.S. PATENT DOCUMENTS

2003/0095862 A1* 5/2003 Kawanishi ............. F04D 19/04
415/90
2009/0180503 A1 7/2009 Funaoka et al.
2012/0286603 A1* 11/2012 Suga ..................... H02K 11/33
310/71

(Continued)

FOREIGN PATENT DOCUMENTS

JP 4450181 B2 4/2010
JP 4965466 B2 7/2012

(Continued)

Primary Examiner — Jose A Gonzalez Quinones
(74) Attorney, Agent, or Firm — Maschoff Brennan

(57) ABSTRACT

A drive device includes a cover and a connector case. The cover is shaped into a cup form and has a connector insertion hole at a bottom portion of the cover. In a view taken in a connector inserting direction, the connector insertion hole is larger than a contour of a connector portion of the connector case, and a gap between an inner wall surface of the connector insertion hole and the contour of the connector portion is equal to or smaller than 3 mm. Thereby, although the connector insertion hole is formed to be larger than the connector portion to enable the insertion of the connector portion into the connector insertion hole at a time of assembly, a size of a cross section of the opening of the connector insertion hole is minimized.

5 Claims, 4 Drawing Sheets

(56) References Cited

U.S. PATENT DOCUMENTS

| | | | |
|---|---|---|---|
| 2015/0115754 A1 | 4/2015 | Yamasaki | |
| 2015/0115755 A1* | 4/2015 | Yamasaki | H02K 5/10 |
| | | | 310/71 |
| 2015/0155759 A1* | 6/2015 | Matsuo | H02K 9/22 |
| | | | 310/52 |

FOREIGN PATENT DOCUMENTS

| | | |
|---|---|---|
| JP | 2015-89215 A | 5/2015 |
| JP | 2015-89216 A | 5/2015 |

\* cited by examiner

DRIVE DEVICE

CROSS REFERENCE TO RELATED APPLICATION

This application is the U.S. national phase of International Application No. PCT/JP2017/002209 filed on Jan. 24, 2017 and is based on and incorporates herein by reference Japanese Patent Application No. 2016-26544 filed on Feb. 16, 2016.

TECHNICAL FIELD

The present disclosure relates to a drive device that includes a motor and a control unit.

BACKGROUND ART

Previously, there is known a drive device that includes: a motor; and a control unit, which is integrated with the motor and controls the motor. In this type of drive device, the control unit is placed in a casing. The casing is fixed to a housing of the motor to protect the control unit from an external shock and limit intrusion of dust and water to the control unit.

For example, in the patent literature 1, the casing includes: a cover that is shaped into a cup form; and a connector case. The cover includes: a cover main body that is shaped into a tubular form; and an inner ring portion that is located at one end of the cover main body. The connector case includes: a lid portion, which closes an opening of the inner ring portion at an inside of the cover; and a connector portion that projects from the lid portion to an outside of the cover through the opening of the inner ring portion. An O-ring is placed between the cover and the lid portion.

The inventors of the present application have found the following disadvantage. Specifically, once the drive device of the patent literature 1 is put in use, a compression ratio of the O-ring may possibly be reduced to cause deterioration in the waterproofness of the drive device. The patent literature 1 does not mention anything about this disadvantage as well as a solution of this disadvantage.

CITATION LIST

Patent Literature

PATENT LITERATURE 1: JP2015-89216A (corresponding to US2015/0115755A1)

SUMMARY OF INVENTION

The present disclosure is made in view of the above point, and it is an objective of the present disclosure to provide a drive device that limits deterioration in the waterproofness.

The inventors of the present application have studied the reduction in the compression ratio of the O-ring during the use of the drive device and found that this reduction in the compression ratio of the O-ring is caused by deformation of the inner ring portion in a form of warping in response to a change in the temperature of the drive device.

Basically, it is desirable that the opening of the inner ring portion has a simple shape in view of easy processing of the opening of the inner ring portion. Therefore, in order to form a compressing portion, which compresses the O-ring, at the inner ring portion, normally, the opening is shaped in a form of a circle that extends all around along the O-ring at a location that is slightly inwardly displaced from the O-ring in the radial direction, and only bolt fixing portions project radially inwardly from the inner ring portion. In the patent literature 1, the opening is also formed to have this configuration.

However, the inventors of the present application have an opinion of that in order to limit the reduction in the compression ratio of the O-ring, the opening should have a shape that limits the warping of the inner ring portion rather than the simple shape described above, and thereby the inventors of the present application have finished the structure of the present disclosure.

A drive device of the present disclosure includes a motor, a cover, a control unit, a connector case and a ring-shaped seal member. The cover is shaped into a cup form and includes: a tubular portion that is installed to a housing of the motor; and a bottom portion that includes a connector insertion hole. The control unit is installed in an inside of the cover and controls energization of a coil of the motor. The connector case includes: a lid portion, which is installed in the inside of the cover to close the connector insertion hole from the inside of the cover; and a connector portion that projects from the lid portion to an outside of the cover through the connector insertion hole. The ring-shaped seal member is installed between the cover and the lid portion.

An inserting direction of the connector portion into the connector insertion hole is defined as a connector inserting direction. The connector insertion hole is formed such that in a view taken in the connector inserting direction, the connector insertion hole is larger than a contour of the connector portion, and a gap between an inner wall surface of the connector insertion hole and the contour of the connector portion is equal to or smaller than 5 mm.

In the present disclosure, although the connector insertion hole is formed to be larger than the connector portion to enable the insertion of the connector portion into the connector insertion hole at a time of assembly, the gap between the connector insertion hole and the contour of the connector portion is set to be equal to or smaller than 5 mm, and thereby a size of a cross section of the opening of the connector insertion hole is minimized. When the size of the cross section of the opening of the connector insertion hole is reduced, the rigidity of the cover is increased, and thereby the amount of deformation of the cover, which is induced by the temperature change, is reduced. Therefore, a reduction in a compression ratio of the O-ring during the use of the drive device can be limited to limit deterioration in the waterproofness of the drive device.

BRIEF DESCRIPTION OF DRAWINGS

The present disclosure, together with additional objectives, features and advantages thereof, will be best understood from the following description, the appended claims and the accompanying drawings.

DESCRIPTION OF EMBODIMENTS

Hereinafter, embodiments of the present disclosure will be described with reference to the drawings. In the following embodiments, substantially identical structural portions will be indicated by the same reference signs and will not be described redundantly for the sake of simplicity.

First Embodiment

Figure 1:
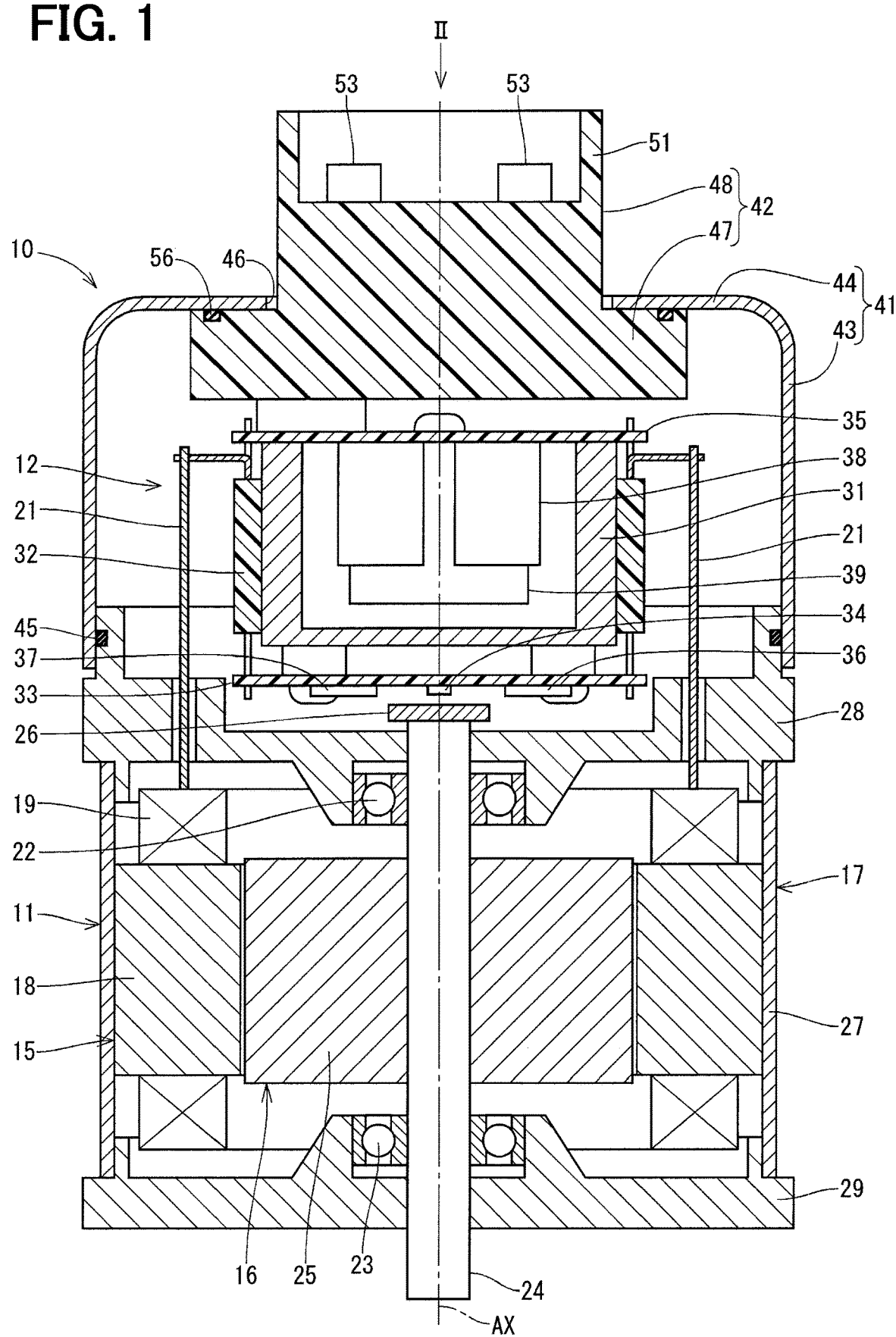
FIG. 1 is a cross-sectional view of a drive device according to a first embodiment of the present disclosure.

FIG. 1 shows a drive device according to a first embodiment of the present disclosure. The drive device 10 is used as a drive source of an electric power steering apparatus that assists a steering operation of a driver of a vehicle.

Figure 2:
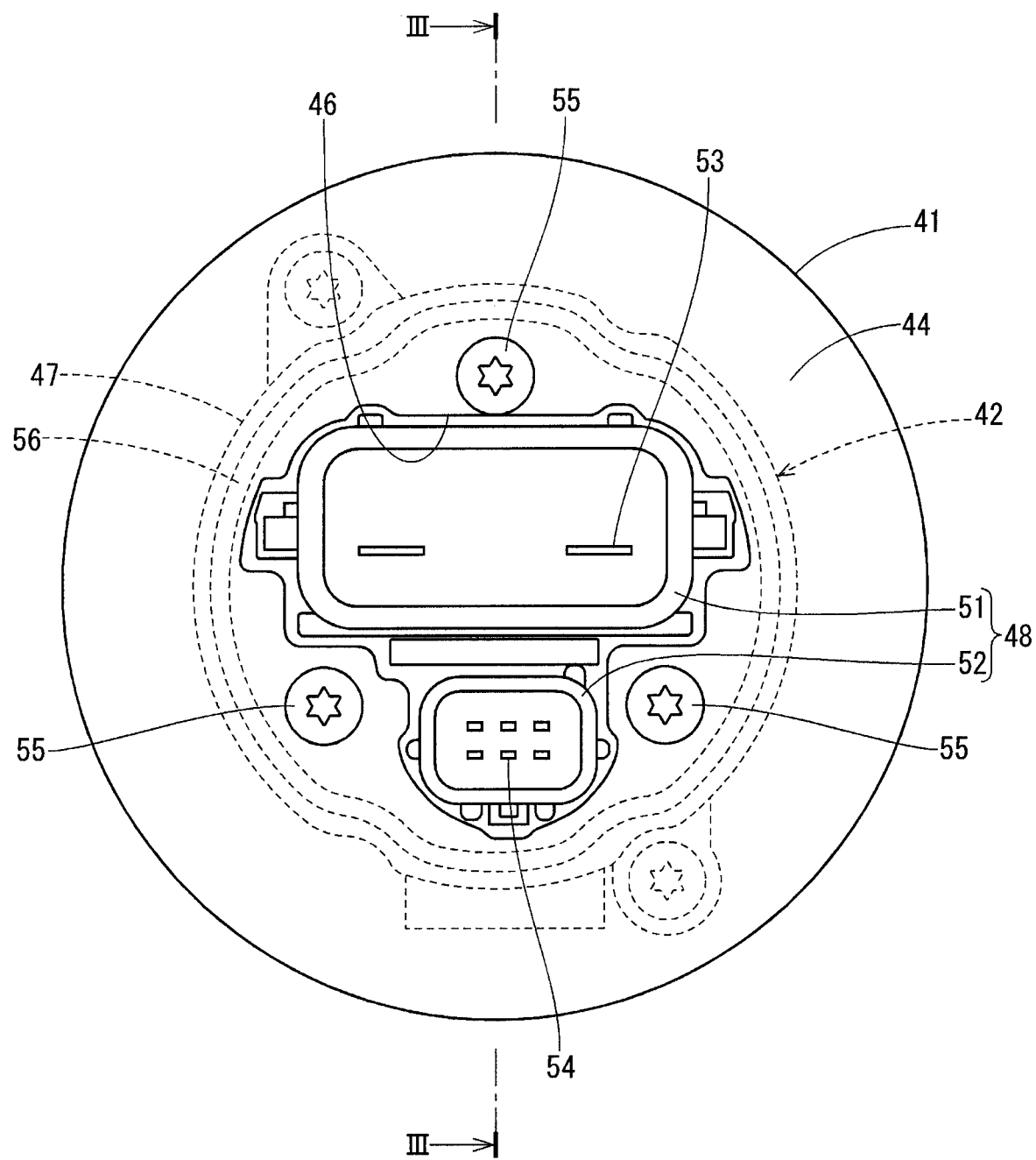
FIG. 2 is a view of the drive device of FIG. 1 taken in a direction of an arrow II, i.e., a view of a connector insertion hole of the cover taken in a connector inserting direction.
Figure 3:
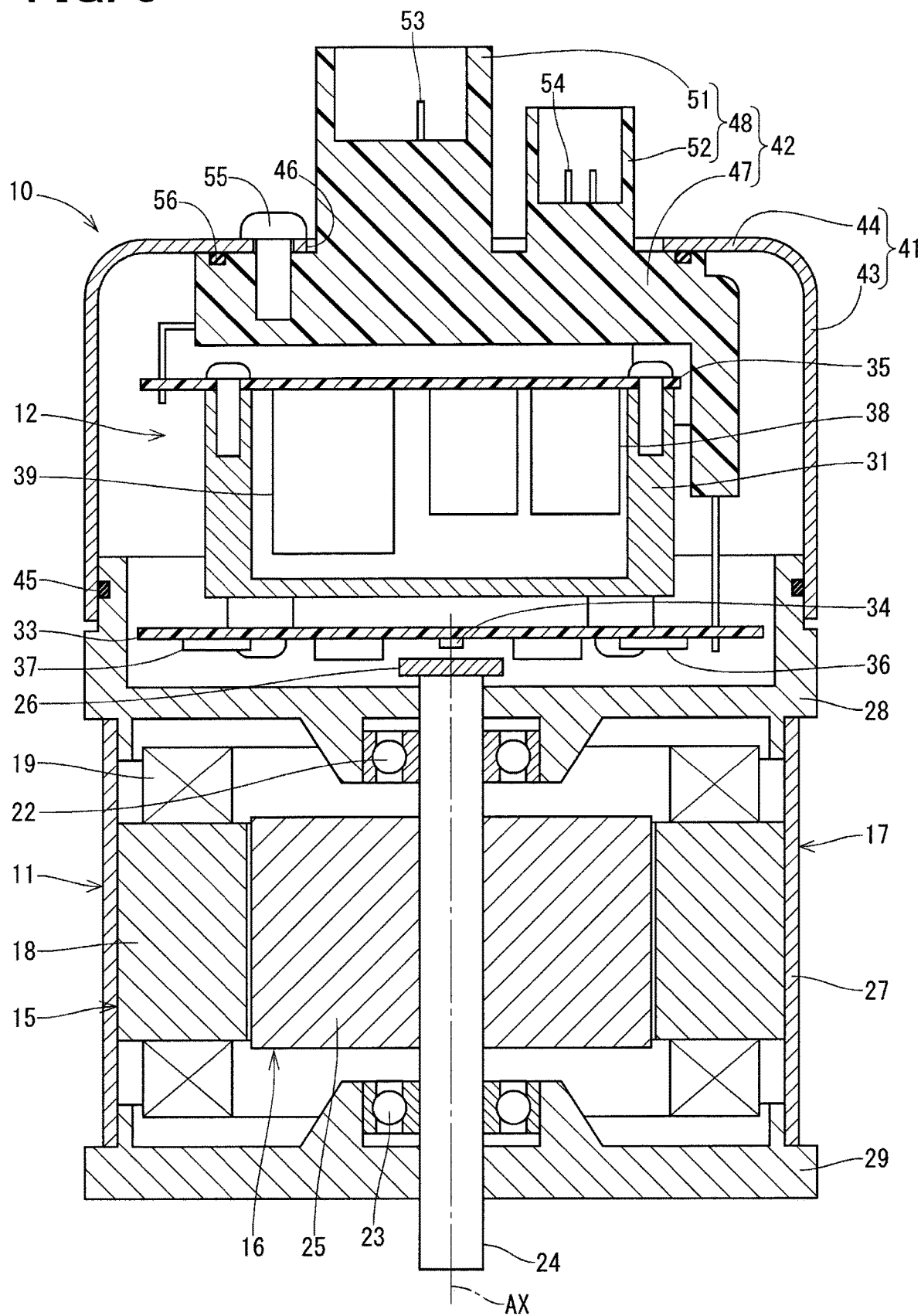
FIG. 3 is a cross-sectional view taken along line III-III in FIG. 2.

First of all, an overall structure of the drive device 10 will be described with reference to FIGS. 1 to 3.

The drive device 10 is an electromechanical drive device that includes: a motor 11; and a control unit 12, which is integrated with the motor 11 and controls the motor 11.

The motor 11 is a three-phase brushless motor and includes a stator 15; a rotor 16; and a housing 17 that receives the stator 15 and the rotor 16.

The stator 15 includes: a stator core 18 that is fixed in an inside of the housing 17; and two sets of three-phase coils (hereinafter referred to as coils) 19 that are installed to the stator core 18. Each of lead wires 21 extends from a corresponding one of phase windings of the coils 19.

The rotor 16 includes: a rotatable shaft 24, which is supported by bearings 22, 23 that are installed to the housing 17; and a rotor core 25, which is fitted to the rotatable shaft 24. The rotor 16 is rotatable relative to the stator 15. A sensing-subject member 26, which is made of a permanent magnet, is placed at one end of the rotatable shaft 24. The sensing-subject member 26 is used to sense a rotational angle of the rotor 16 through a rotational angle sensor 34 described later.

The housing 17 includes: a case 27, which is shaped into a tubular form; a first frame end 28, which is placed at one end of the case 27; and a second frame end 29, which is placed at the other end of the case 27. The first frame end 28 and the second frame end 29 clamp the case 27 therebetween and are fastened together by a plurality of bolts (not shown). The lead wires 21 extend through the first frame end 28.

The control unit 12 includes a heat sink 31, power modules 32, a control circuit board 33, a rotational angle sensor 34, a power circuit board 35, and various electronic components 36-39.

The heat sink 31 is fixed to the first frame end 28.

Each power module 32 includes a plurality of switching elements (not shown) that form an inverter, and each power module 32 is connected to corresponding ones of the lead wires 21.

The control circuit board 33 is fixed to a side of the heat sink 31, at which the first frame end 28 is placed. The rotational angle sensor 34, an integrated circuit 36 and a microcomputer 37 are installed to the control circuit board 33. The integrated circuit 36 outputs a drive signal to the switching elements, and the microcomputer 37 computes a command value for an electric power to be supplied to the respective phase windings of the coils 19.

The power circuit board 35 is fixed to an opposite side of the heat sink 31, which is opposite from the control circuit board 33. Capacitors 38 and a choke coil 39 are installed to the power circuit board 35. The capacitors 38 store electric charges and thereby assist the electric power supply to the coils 19. The choke coil 39 form a filter circuit in corporation with the capacitors 38.

The drive device 10, which is configured in the above described manner, generates a rotating magnetic field by sequentially energizing the phase windings of the coils 19 based on the measurement signal of the rotational angle sensor 34 to rotate the rotor 16. The control unit 12 of the drive device 10 is installed at a location that is on one side of the motor 11 in an axial direction. Therefore, it is possible to avoid direct application of vibrations of the motor 11 to the control unit 12.

Next, the characteristic structure of the drive device 10 will be described with reference to FIGS. 1 to 3.

The drive device 10 further includes a cover 41 and a connector case 42.

The cover 41 is shaped into a cup form and includes a tubular portion 43 and a bottom portion 44. An end part of the tubular portion is fitted to the first frame end 28. A gap between the tubular portion 43 and the first frame end 28 is sealed with an O-ring 45. The bottom portion 44 includes a connector insertion hole 46.

The connector case 42 includes a lid portion 47 and a connector portion 48. The lid portion 47 is installed in an inside of the cover 41 to close the connector insertion hole 46 from the inside of the cover 41. The connector portion 48 projects from the lid portion 47 to an outside of the cover 41 through the connector insertion hole 46 and includes a power supply connector 51 and a signal connector 52. The power supply connector 51 includes power supply terminals 53. The signal connector 52 includes signal terminals 54. The power supply terminals 53 and the signal terminals 54 extend through the lid portion 47 and are connected to the control circuit board 33 or the power circuit board 35. Each connector 51, 52 includes: a tubular portion that is configured to mate with a connector of a wire harness that is used to connect with an external device; an engaging portion that limits removal of the mating connector; and ribs that are formed for a reinforcing purpose.

The bottom portion 44 of the cover 41 and the lid portion 47 of the connector case 42 are fixed together by three screws serving as fixing portions) 55. The screws 55 are installed to an edge part of the connector insertion hole 46. An O-ring 56 is installed between the bottom portion 44 of the cover 41 and the lid portion 47 of the connector case 42. The O-ring 56 seals a gap between the bottom portion 44 and the lid portion 47 and serves as "a first ring-shaped seal member" while the O-ring 45 described above serves as "a second ring-shaped seal member."

Here, a direction of inserting the connector portion 48 into the connector insertion hole 46 is defined as a connector inserting direction. In the present embodiment, the connector inserting direction coincides with a direction that is parallel with a rotational axis AX of the motor 11. In a view taken in the connector inserting direction, the connector insertion hole 46 is larger than a contour of the connector portion 48, and a gap between an inner wall surface of the connector insertion hole 46 and the contour of the connector portion 48 is equal to or smaller than 3 mm. According to the present embodiment where the connector portion 48 includes the plurality of connectors 51, 52 as a connector group, the contour of the connector portion 48 refers to a contour along a single silhouette of the connector group included in the connector portion 48.

As described above, according to the present embodiment, although the connector insertion hole 46 is formed to be larger than the connector portion 48 to enable the insertion of the connector portion 48 into the connector insertion hole 46 at the time of assembly, the gap between the connector insertion hole 46 and the contour of the connector portion 48 is set to be equal to or smaller than 3 mm, and thereby a size of a cross section of the opening of the connector insertion hole 46 is minimized. When the size of the cross section of the opening of the connector insertion hole 46 is reduced, the rigidity of the cover 41 is increased, and thereby the amount of deformation of the cover 41, which is induced by the temperature change, is reduced. Therefore, a reduction in a compression ratio of the O-ring during the use of the drive device can be limited to limit a deterioration in the waterproofness of the drive device.

Second Embodiment

Figure 4:
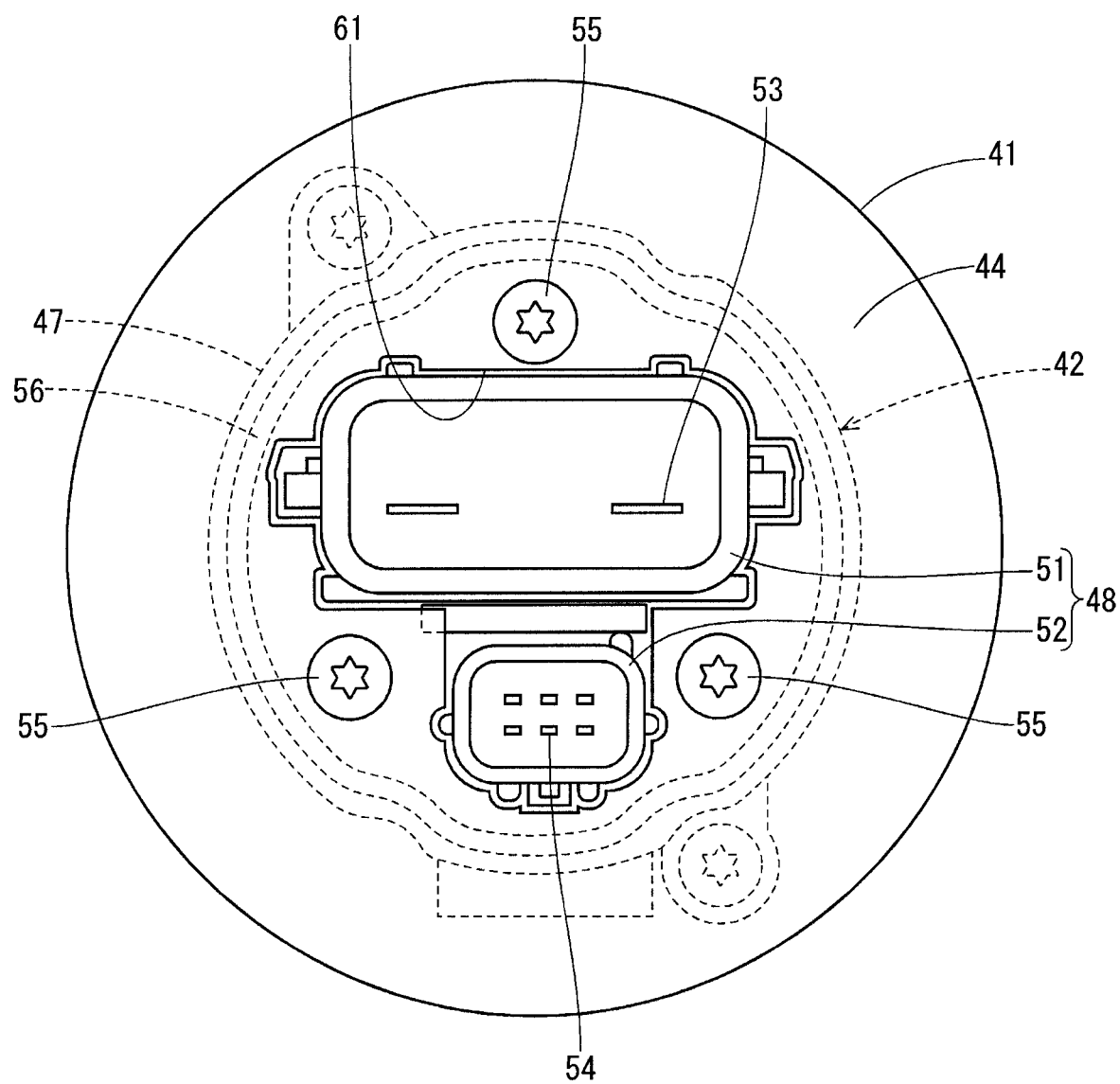
FIG. 4 is a view of a cover side of a drive device according to a second embodiment of the present disclosure taken in an axial direction.

In the second embodiment of the present disclosure, with reference to FIG. 4, a connector insertion hole 61 is formed as follows. That is, in a view taken in the connector inserting direction, the connector insertion hole 61 is larger than the contour of the connector portion 48, and a gap between an inner wall surface of the connector insertion hole 61 and the contour of the connector portion 48 is equal to or smaller than 5 mm and is constant all around the contour of the connector portion 48 about the rotational axis AX.

OTHER EMBODIMENTS

In another embodiment of the present disclosure, the connector portion may include only one connector or may include three or more connectors. Furthermore, the one connector may include the power supply terminal(s) and the signal terminal(s).

In another embodiment of the present disclosure, the number of the screws, which are used to fix the cover and the connector case together, may be other than three. Furthermore, the fixing method for fixing between the cover and the connector case should not be limited to the screwing, and another method, such as fitting, may be used to fix the cover and the connector case together.

In another embodiment of the present disclosure, the cover is not necessarily made of the metal and may be made of, for example, resin.

The present disclosure should not be limited to the above embodiments and may be implemented in various other forms without departing from the principle of the present disclosure.

The invention claimed is:

1. A drive device to be used in an electric power steering apparatus, the drive device comprising:
   a motor;
   a cover that is shaped into a cup form and includes:
      a tubular portion that is installed to a housing of the motor; and
      a bottom portion that includes a connector insertion hole;
   a control unit that is installed in an inside of the cover and controls energization of a coil of the motor;
   a connector case that includes:
      a lid portion, which is installed in the inside of the cover to close the connector insertion hole at the inside of the cover; and
      a connector portion that projects from the lid portion to an outside of the cover through the connector insertion hole;
   a first ring-shaped seal member that is installed between the cover and the lid portion; and
   a fixing portion that fixes the bottom portion and the lid portion together, wherein:
   a portion of the cover surrounding the fixing portion extends radially beyond an entirety of a head of the fixing portion;
   an inserting direction of the connector portion into the connector insertion hole is defined as a connector inserting direction;
   the connector insertion hole is formed such that in a view taken in the connector inserting direction, the connector insertion hole is larger than a contour of the connector portion, and an inner wall surface of the connector insertion hole is placed at a location that is closer to the contour of the connector portion in comparison to a location of the fixing portion, and
   the connector insertion hole is formed such that in the view taken in the connector inserting direction, a gap between the inner wall surface of the connector insertion hole and the contour of the connector portion is equal to or smaller than 5 mm.

2. The drive device according to claim 1, wherein the connector insertion hole is formed such that in the view taken in the connector inserting direction, a gap between the inner wall surface of the connector insertion hole and the contour of the connector portion is equal to or smaller than 3 mm.

3. The drive device according to claim 1, wherein the connector insertion hole is formed such that in the view taken in the connector inserting direction, a gap between the inner wall surface of the connector insertion hole and the contour of the connector portion is constant all around the contour of the connector portion about a rotational axis of the motor.

4. The drive device according to claim 1, wherein:
   the housing includes:
      a first frame end that is located on a side where the control unit is placed; and
      a second frame end that is located on an opposite side that is opposite from the control unit; and
   the drive device further comprises a second ring-shaped seal member that is installed between the tubular portion and the first frame end.

5. The drive device according to claim 4, wherein a lead wire, which extends from a winding of the coil of the motor, is installed to extend through the first frame end.

* * * * *